Oct. 29, 1946. L. E. WILLIAMS, JR., ET AL 2,410,398
RIVET
Filed Aug. 24, 1945
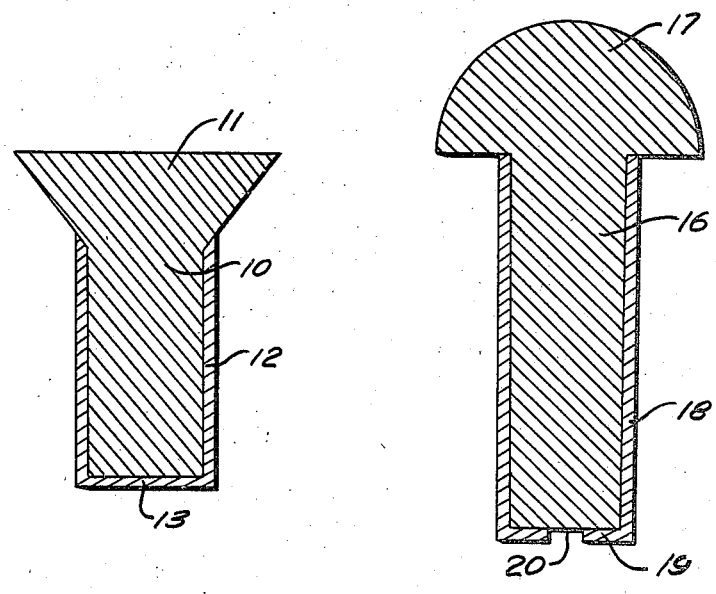
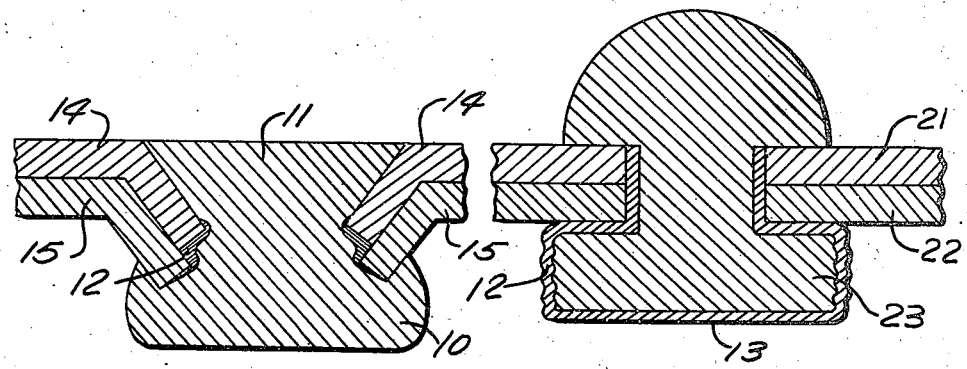
INVENTOR.
LEWIS E. WILLIAMS JR.
PAUL L. SMITH
BY
J. Edwin Coates
ATTORNEY Patented Oct. 29, 1946

2,410,398

UNITED STATES PATENT OFFICE 2,410,398

RIVET

Lewis E. Williams, Jr., and Paul L. Smith, Los Angeles, Calif., assignors to Douglas Aircraft Company, Inc., Santa Monica, Calif.

Application August 24, 1945, Serial No. 612,424

8 Claims. (Cl. 85—37)

This invention relates to fastening means such as rivets and more particularly to a rivet to be used to secure together wall members of an enclosure adapted to house a fluid.

The rivet of the present invention is particularly adapted to be used to form integral fuel tanks such as are now used in many of the large cargo-type airplanes. The rivet is extremely useful in this application as it carries a means which will automatically form a seal when the rivet is upset. The means forming the seal is one which will not easily separate from the rivet so that the rivet of the present invention may be handled and inserted into the preformed openings in the members to be secured together in the same manner as the conventional rivets are now inserted.

In the now preferred form of the invention the means for forming the seal comprises a hollow cylindrical member at least partially closed at the one end. The member has an inner diameter substantially equal to the diameter of the shank of the rivet and is force-fitted about the shank of the rivet to form a skin of a material more ductile than that of the shank. The cylindrical member is of such a length that the transverse end wall formed at the one end thereof engages the end face of the shank when the member is mounted thereto.

In one embodiment of the rivet of the present invention the transverse wall completely closes the end of the cylindrical member so that the latter is substantially cup-like in shape.

In another embodiment of the present invention, the transverse wall of the cylindrical member is formed as an inwardly directed annular flange adapted to engage the end face of the shank when the member is mounted thereto. In this embodiment of the invention, as in the form where the transverse wall completely closes the one end of the sleeving member, the transverse wall prevents the member from being urged upwardly or skinned back from the shank of the rivet as the shank is inserted into the openings of the parts to be secured together by the rivet. This obviates the difficulty had with previously proposed rivets in which a sleeve was mounted about the shank of the same. In these prior proposals the sleeve was urged upwardly or skinned back from the shank of the rivet, in many instances, as the shank was pushed into the aligned openings of the parts to be secured together.

The material of the cylindrical member is relatively soft so that the sleeve when the rivet is upset is compressed between the upper end of the shank and the edges of the openings in the parts being joined. As the material of the member sleeving the shank is relatively soft it forms a packing which fills and seals the joint between the rivet and the parts being joined together, as well as the joint between the parts themselves.

Other features and advantages of the present invention will be obvious from the following description taken in connection with the accompanying drawing in which:

Figure 1 is a transverse sectional view of one form of the rivet of the present invention;

Figure 2 is a view similar to Figure 1 but showing a modified form of the present invention;

Figure 3 is a sectional view showing the rivet illustrated in Figure 1 mounted in aligned apertures of two sheet-like members and showing the disposition of the material of the sleeve after the rivet has been upset; and Figure 4 is a view similar to Figure 3 but showing a modified form of the rivet of the present invention after it has been upset.

The rivet of the present invention in the one illustrated embodiment of the same comprises a shank 10 formed with a head portion 11. Although the head in the illustrated embodiment of the invention is shown as a flush head, the rivet may be formed with any head desired.

The shank 10 of the rivet is completely encased by a cup-shaped member 12 of such depth that the lower wall 13 thereof when the cup-shaped member 12 is mounted to the shank is in engagement with the end face of the shank 10.

The cup-shaped member in the now preferred embodiment of the invention should be securely fixed to the shank of the rivet to prevent the member from separating from the rivet after it has been assembled therewith. Although a number of different methods can be used for mounting the cup-shaped member 12 to the shank of the rivet, it is now preferred to form the member with an inner diameter substantially equal to the diameter of the shank so that the member can be press-fitted to the shank. The cup-like member should also be of such a length that when the lower or bottom wall 13 thereof is engaging the end-face of the shank the open end of the member should engage and partially surround the lower surface of the head 11.

In the use of the rivet of the present invention the same is mounted or inserted in the same manner as a conventional rivet is inserted into aligned apertures or openings formed in the parts to be joined. When the rivet is upset, as shown in Figure 2, the cup-like member is forced upwardly of the shank and is compressed between the head of the rivet and the edges of the openings in the parts to be joined. As the material is relatively soft and ductile the material flows into and fills the joint between the rivet and the two sheets 14 and 15, as well as the joint between the sheets themselves.

As the cup-like member is formed with the transverse wall 13 the member is not scraped or skinned upwardly of the shank when the rivet is inserted into the preformed openings in the sheets. The member therefore maintains its shape until the rivet is upset.

In the form of the invention shown in Figure 3, wherein the flush-head rivet is shown mounted in the dimpled sheets, the wall 13 may be destroyed during the upsetting operation as the edges of the dimpled opening have been found in some installations to shear off the material of the member 12 as the rivet is upset. Where a rivet of the present invention is used to secure a joint such as formed by sheets 21 and 22, referring now to Figure 4, the wall 13 of the member 12 in most instances is not destroyed during the upsetting operation but actually clings to the upset end of the rivet 23 to form a mass of material somewhat as illustrated in the figure referred to above.

The thickness of the wall of the member 12 should be such that the compressed member will supply enough material to form the seal when the rivet is upset. If the thickness of the wall is too great the material of the member might tend to wedge itself between the sheets 14 and 15 and urge the sheets apart during the upsetting operation. The thickness of the wall of the member can be easily determined by such factors as the diameter of the openings in the sheets to be joined, the diameter of the rivet shank, and the length of the same.

It has been found that it is difficult to form relatively deep cup-like members for use with rivets having relatively long shanks. To obviate the necessity of drawing such cup-like members, there is shown in Figure 2 a modified form of the rivet of the present invention in which the rivet is formed with a relatively long shank 16 and a head 17 of any desired shape. In this form of the rivet of the present invention the shank 16 carries a sleeve 18 formed with an annular flange 19 covering only a portion of the end face 20 of the shank 16. The sleeve 18 is preferably formed by drawing a relatively long tubular member of the desired wall thickness and then cutting lengths from the tubular member in such a way that the cut-off tool draws a portion of the wall thereof inwardly to form the annular flange 19.

As in the earlier described form of the invention, the inner diameter of the sleeve 18 is such relative to the diameter of the shank 16 that the sleeve can be press-fitted to the shank. The annular flange 19 should be of such a size as to prevent the sleeve from being scraped or skinned upwardly of the shank when the rivet is inserted into the preformed aligned openings in the sheets to be held by the rivet. The material of the sleeve 18, as should be understood, forms a seal after the rivet has been upset, as does the material of the member 12 in the form of the invention shown in Figures 1 and 3.

It will now be seen that the present invention provides a rivet which carries a means for automatically forming a seal when the rivet is upset and which does not complicate the installation and upsetting of the rivet.

Although the now preferred embodiment of the present invention has been illustrated and described herein, it is to be understood that the invention is not to be limited thereto and is susceptible to changes in form and detail within the scope of the appended claims.

We claim:

1. A rivet comprising: a shank; a head formed at one end of said shank; and means surrounding and snugly engaging the shank and at least a portion of the end face thereof, said means being formed of a relatively soft material easily deformed during the rivet-upsetting operation, whereby the material thereof flows into and seals the joint held by the rivet when the latter is upset.

2. A rivet comprising: a shank; a head formed at one end of said shank; and a covering of a material more ductile than the material of said shank carried by said shank and surrounding at least a portion of said head and the end face of said shank, the material of said covering being easily deformed when the rivet is upset and adapted to flow into and seal the annular passage between the rivet and the parts joined by the rivet.

3. A rivet comprising: a shank; a head formed at one end of said shank; and a skin of a material more ductile than that of said shank secured to and completely surrounding said shank and at least a portion of the end face of the same, the material of said skin being easily deformed when the rivet is upset and adapted to flow into and seal the joint held by the rivet when the latter is upset.

4. A rivet comprising: a shank; a head formed at one end of said shank; and a cup-like member receiving said shank, the depth of said cup-like member being at least as great as the length of said shank so that the bottom wall of said cup-like member is engaged by the end face of said shank when the same is mounted in said member, the material of said member being easily deformed when the rivet is upset and adapted to flow into and seal the annular passage between the rivet and the parts joined by the rivet.

5. A rivet comprising: a shank; a head formed at one end of said shank; a sleeve of relatively ductile material circumscribing said shank; and a transverse end wall closing the end of said sleeve, said transverse end wall snugly engaging the end face of said shank so that said shank is completely encased by the sleeve and the transverse end wall thereof, the material of said sleeve being easily deformed when the rivet is upset and adapted to flow into and seal the annular passage between the rivet and the parts joined by the rivet.

6. A rivet comprising: a shank; a head formed at one end of said shank; and a hollow cylindrical member, closed at one end, sleeving said shank and extending about at least a portion of said head, said sleeve being formed of a material easily deformed and adapted to flow into and seal the joint held by the rivet when the latter is upset.

7. A rivet comprising: a shank; a head formed at one end of said shank; a hollow cylindrical member sleeving said shank; and an inwardly directed annular flange integrally formed with said member at one end thereof and engaging and extending about at least a portion of the end face of said shank, said sleeve being formed of a material easily deformed and adapted to flow into and seal the joint held by the rivet when the latter is upset.

8. A rivet comprising: a shank; a head formed integral with one end of said shank; and a thin-walled sleeve encasing said shank; the inner diameter of said sleeve being substantially equal to the outer diameter of said shank whereby said sleeve may be retained on said shank by friction alone; said sleeve being formed of a metal more ductile than the metal of said shank, whereby said sleeve may readily separate from said shank and flow into and seal the clearance between the rivet and the parts joined by said rivet when the latter is upset.

LEWIS E. WILLIAMS, Jr.
PAUL L. SMITH.